United States Patent [19]

Megahed et al.

[11] 3,911,094
[45] Oct. 7, 1975

[54] METHOD OF PREPARING STABLE NiOOH

[75] Inventors: El Sayed Megahed, Madison; Patrick J. Spellman, Middletown, both of Wis.; Leif Tennare, Lund, Sweden

[73] Assignee: ESB Incorporated, Philadelphia, Pa.

[22] Filed: Jan. 28, 1974

[21] Appl. No.: 437,233

[52] U.S. Cl. .................. 423/592; 136/29; 136/137
[51] Int. Cl. ............................................ C01g 53/04
[58] Field of Search ............... 423/592; 136/29, 137

[56] References Cited
UNITED STATES PATENTS

| 1,083,355 | 1/1914 | Edison | 423/592 X |
| 1,167,484 | 1/1916 | Edison | 423/592 X |
| 3,347,706 | 10/1967 | Krivanik | 136/29 X |
| 3,436,267 | 4/1969 | Faber | 136/29 |
| 3,455,741 | 7/1969 | Schneider | 136/29 X |
| 3,806,591 | 4/1974 | Lever et al. | 423/592 |

Primary Examiner—Herbert T. Carter

[57] ABSTRACT

Stable NiOOH is prepared by mixing an alkali metal hydroxide with nickel hydrate and ozonating the resultant mixture.

9 Claims, 2 Drawing Figures

METHOD OF PREPARING STABLE NIOOH

BACKGROUND OF THE INVENTION

1. Field of the Invention - This invention relates to a method for preparing stable NiOOH by mixing an alkali metal hydroxide with a nickel hydrate and ozonating the resultant mixture. More particularly, the nickel hydrate is mixed with potassium hydroxide, sodium hydroxide, lithium hydroxide, rubidium hydroxide or cesium hydroxide and the resultant mixture is then dry ozonated. The resultant stable NiOOH is a useful cathodic material in both primary and secondary batteries.

2. Description of the Prior Art - The nickel zinc couple has been the subject of extensive investigation and experimentation in the last several years. Recent work has indicated possible recharging of the system, and the proven long life capabilities of the nickel electrode combined with the high rate and energy density of the zinc electrode result in a practical high energy secondary battery. There has been, however, little commercial success in the area of primary nickel-zinc cells and the principal reason for this lack of success has been the instability of the nickel oxyhydroxide utilized as a cathodic material in such cells. The form of nickel oxide generally utilized in these primary cells has been trivalent nickel oxyhydroxide which is commonly produced by such methods as the electrochemical oxidation of nickel hydroxide and alkaline electrolyte based on KOH as the major component or the ozonation of nickel-II hydroxide at a temperature of from 20° to 110°C. Such trivalent nickel oxyhydroxide will, however, when contacted with alkaline solutions, give off oxygen according to the following equation:

$$4 \text{ NiOOH} + 2\text{H}_2\text{O} = 4\text{Ni(OH)}_2 + \text{O}_2$$

This evolved oxygen has a detrimental effect on cell capacity and capacity maintenance and additionally may cause the cells in which it is used to bulge or even explode.

It has recently become known that high-valency amorphous nickel oxides could be stablized at their high-valent state and could be successfully exploited faradaically thus permitting their use as a cathodic material in primary cells. Tetravalent nickel oxyhydroxide is now recognized as satisfying the requirements for use as a cathodic material in primary cells.

It has heretofore been disclosed that a stable tetravalent nickel oxyhydroxide can be prepared electrochemically; see for example Tuomi, Journal of the Electrochemical Society, January 1965, pages 1 to 12. Tuomi in this article discloses the preparation of "tetravalent nickel" by charging crystalline Ni(OH)$_2$ at 125 milliamps for 17 days in a suitable electrolyte.

A novel method has now been discovered for the preparation of stable tetravalent nickel oxyhydroxide which tetravalent nickel oxyhydroxide is useful as a cathodic material in both primary and secondary batteries.

SUMMARY OF THE INVENTION

This invention is directed to a method for preparing stable tetravalent nickel oxyhydroxide by mixing an alkali metal hydroxide with nickel hydrate and dry ozonating the resultant mixture.

DESCRIPTION OF THE INVENTION

Figure 1:
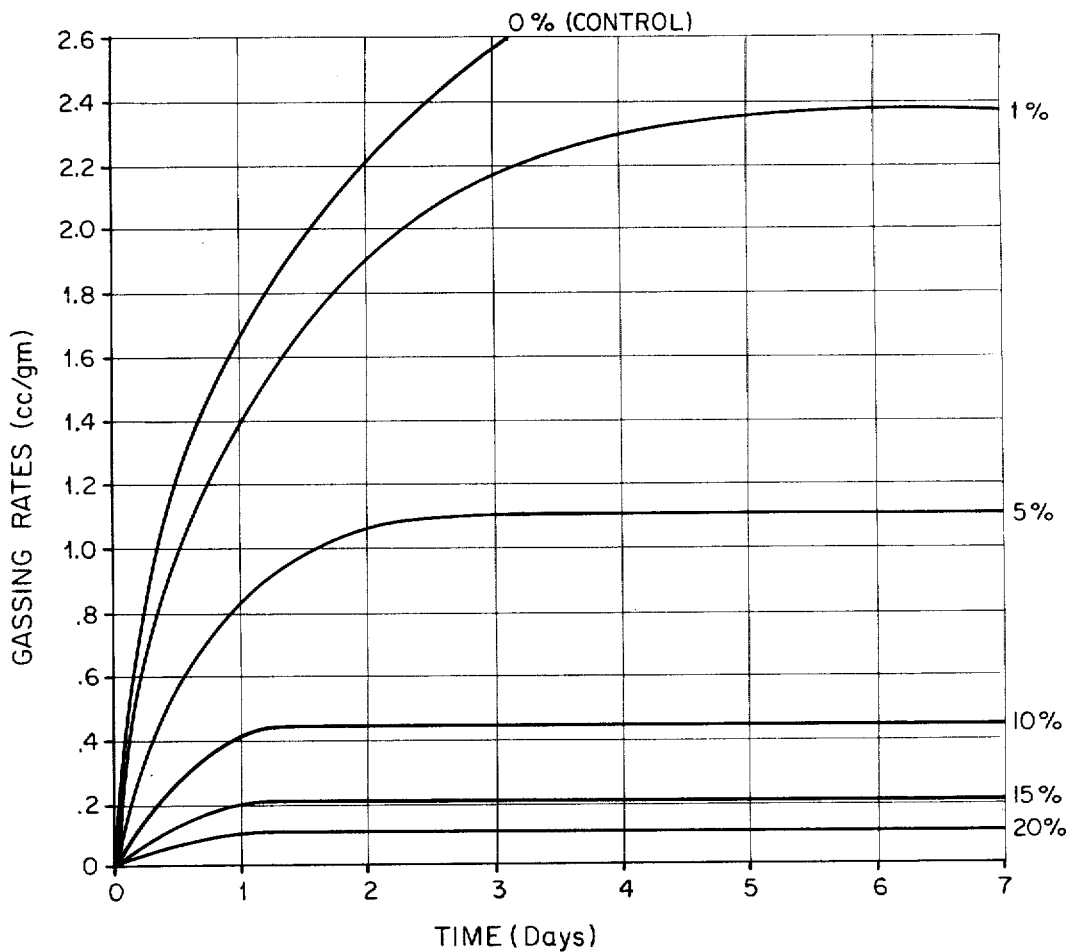
FIG. 1 is a graphic representation of the gassing rate of the stable nickel oxyhydroxide depolarizer prepared according to the method of this invention plotted against the time in days.

A novel method has now been discovered for the preparation of stable tetravalent nickel oxyhydroxide which is an effective and efficient cathodic material for use in both primary and secondary batteries. If $x$ in the formula — Ni$_2$O$_x$ — (nickel oxyhydroxide) is 3.0, the product is trivalent. If $x$ in the formula is more than 3.0 then the product is at least partially converted to the tetravalent state. Ideally, a product wherein the value of $x$ is 4.0, i.e., the entire compound is in the tetravalent state. This is, however, the "ideal" state and for the purposes of this invention the term tetravalent shall mean nickel oxyhydroxide wherein the value of $x$ is more than 3.0.

In the process of this invention, a dry alkali metal hydroxide is mixed with the dry nickel hydrate, i.e., Ni(OH)$_2$, and the resultant mixture is dry ozonated to produce stable tetravalent nickel oxyhydroxide.

The dry nickel hydrate is readily available commercially. By the term dry alkali metal hydroxide as used herein is meant a dry hydroxide of potassium, sodium, lithium, cesium, rubidium and mixtures thereof, potassium hydroxide being the preferred material. These metal hydroxides often contain bound water and for the purpose of this patent will be used as supplied by the manufacturers in a solid form. The amount of metal hydroxide mixed with the nickel hydrate is from about 5 to about 40 wt. percent based on the weight of the dry nickel hydrate. Depending upon the particular alkali metal hydroxide utilized in the preparation of the stable nickel oxyhydroxide, the useful concentration range for each of the metal hydroxides listed above are as follows:

| Potassium hydroxide | about 5 to about 40 wt. percent |
| --- | --- |
| Sodium hydroxide | about 5 to about 30 wt. percent |
| Cesium hydroxide | about 5 to about 40 wt. percent |
| Rubidium hydroxide | about 5 to about 40 wt. percent |
| Lithium hydroxide | about 5 to about 20 wt. percent |

The nickel hydrate and alkali metala hydroxide may be mixed by any method known in the art. For example, the dry nickel hydrate may be placed in a ceramic ball-mill and pellets of the selected alkali metal hydroxide may be ground into fine powder, e.g., in a mortar and pestle, and the ground metal hydroxide powder may be added to the nickel hydrate in the ball-mill. The mixture could then be ball-milled for about 30 minutes or until a fine powder is produced. The resultant fine powder may then be passed through a screen, e.g., 50 mesh, to eliminate large particles prior to ozonation.

The mixture obtained above would then be dry ozonated by an appropriate method, for example, the mixture could be transferred from the ball-mill to an Erlenmeyer flask and the flask could be rotated by a small motor while ozone is passed over the mixture in the rotating flask. The ozone oxidizes the nickel hydrate-metal hydroxide mixture into nickelic oxyhydroxide "nickelic oxide" as evidenced by the immediate change of the green Ni(OH)$_2$ into black NiOOH "Ni$_2$O$_3$ . H$_2$O" according to this reaction: O$_3$ + 2 Ni(OH)$_2$ — 2 NiOOH + H$_2$O + O$_2$ Continued ozonation leads to the formation of black and gray tri and tetravalent mixture of the nickelic oxide. At the end of the ozonation process, most of the nickel hydrate is converted into gray tetravalent nickelic oxide Ni(OH)$_4$ "NiO$_2$ . 2 H$_2$O" according to this reaction:

O$_3$ + 2 NiOOH + 3 H$_2$O — 2 NiO$_2$ . 2 H$_2$O + O$_2$

The presence of the metal hydroxide is beneficial for this reaction to proceed as shown in Table 1.

Table 1

Effect of KOH Addition and Time of Ozonation on the Formation of Tri and Tetravalent Nickelic Oxide Valency of Nickel (x) in Ni$_2$O$_x$ End Product

| Time of Ozonation (Hrs) | Ni(OH)$_2$[1] Starting Material Ni$_2$O$_x$ where x = | Color of End Product | Ni(OH)$_2$-KOH[2] Starting Material Ni$_2$O$_x$ where x = | Color of End Product |
|---|---|---|---|---|
| 3 | 2.2326 | Black | 2.1070 | Black |
| 6 | 2.4680 | Black | 2.2480 | Black |
| 12 | 2.7462 | Black | 2.7504 | Black |
| 24 | 2.9482 | Black | 3.0942 | Black-Gray |
| 36 | 2.9500 | Black | 3.2022 | Gray |
| 48 | 2.9904 | Black | 3.5202 | Gray |
| 72 | 2.9801 | Black | 3.5700 | Gray |

[1]Three hundred grams of Ni(OH)$_2$ are ball-milled in a ceramic ball-mill and passed through 50 mesh screen before ozonation.
[2]Ninety grams of KOH (85% KOH, 15% H$_2$O) are mixed with 300 grams of Ni(OH)$_2$ in a ceramic ball-mill and passed through 50 mesh screen before ozonation.

The ozonation is continued until the mixture becomes gray in color indicating the attainment of a tetravelent state wherein the mean valency of the oxide exceeds 3.00. Ozonation may be conducted at room temperature, however, if it is desired to ozonate at cool temperature, the rotating flask may be immersed in a cold bath of running water. The resultant product is stable tetravalent nickel oxyhydroxide, which may be used effectively in cathode preparation for both primary and secondary batteries.

Size 725 and 825 primary cells could be prepared for example by incorporating into a typical cell of the appropriate dimensions, the cathode utilizing the stable nickel oxyhydroxide prepared according to the method of this invention. Such a cell has a two-part container comprising an upper section or cap which houses the negative electrode or anode and the lower section or cup which houses the positive electrode or cathode. Useful anode material include cadmium, indium, zinc, magnesium, aluminum, titanium and manganese, cadmium, indium and zinc being preferred and gelled or semi-gelled zinc being most preferred. The bottom cup may be made of any suitable material such as nickel-plated steel, and the cap may likewise be made of any suitable material known in the art such as tin-plated steel. The cap is insulated from the cup by means of an insulating and sealing collar which may be made of any suitable electrolyte resistant material, such as high-density polyethylene or neoprene and it may be integrally molded around the edges of the cap for insulating the cap from the can and also to constitute an airtight enclosure. The negative electrode is separated from the positive electrode by means of an electrolyte absorbent layer and a separator. The electrolyte absorbent layer may be made of electrolyte resistant highly absorbent substances such as matted cotton fibre. Such material is available commercially for example under the trademark "Webril". The separator layer may be any suitable semi-permeable material such as "Viskon" or "Dexter" "regenerated cellulosic material".

A suitable cathode may be selected utilizing a stable nickel oxyhydroxide prepared according to the method of this invention. The particular cathode prepared will be dependent upon the type of cell being made and the use to which it is to be put. For example, in a typical 725 or 825 cell five parts of stable nickel oxyhydroxide may be dry mixed with one part of a carbon material, e.g., graphite for increasing the mixed conductivity. To that dry mix may be added 1% "Teflon" (Whitcon-8") to serve as a binder and a lubricant and 7.5% electrolyte prewet of 50% potassium hydroxide. These components could be mixed well in for example a Patterson-Kelley blender or Abbe mixer or any other mixing apparatus. After the mix becomes homogeneous, the cathode mix can be pelletized on appropriate apparatus. A pellet thus prepared could then be inserted into the lower section or cup of the cell where it would function as a positive electrode or cathode.

EXAMPLES

The following examples are intended to be merely illustrative of the invention and not in limitation thereof. Unless otherwise indicated, all quantities are by weight.

EXAMPLE 1

Samples of nickel hydrate (Ni(OH)$_2$) (total 50 grams) containing 1% Co(OH)$_2$ were prepared. Potassium hydroxide pellets were ground into fine powder and added to each nickel hydrate sample in the amount of 1, 5, 10, 15, 20, 25 and 30% by weight. The material was then ball-milled for 15 minutes and then ozonated for three hours at cool temperatures, i.e., about 15°C in a Welsbach ozonator Model T-408.

Additional nickel hydrates samples were prepared and ozonated as above but without the addition of the potassium hydroxide. After ozonation, potassium hydroxide was added to the NiOOH as above in the amount of 1, 5, 10, 15, 20, 25 and 30% by weight.

The ozonated mixtures prepared above were tested for gassing by placing one gram of each sample in a separate 12cc centrifuge tube and filling the rest of the tube with 50% KOH. The tubes were placed in a glycol bath maintained at a constant temperature of 145°. Triplicate tests were made on each sample. Gassing was observed by measuring the height of KOH solution and a pipette stoppered over the centrifuge tube. Gassing rates were expressed in terms of cc of gas for one gram of material per day on test. Moisture determinations were done by a Cenco moisture balance.

Data in Table 2 below indicate that the KOH addition in amounts of 10% or greater before ozonation produced an extremely stable nickel oxyhydroxide with greatly reduced gassing. The total gas collected for the untreated gram control was 3.06 cc/gm of nickel oxyhydroxide after one week on test.

Figure 2:
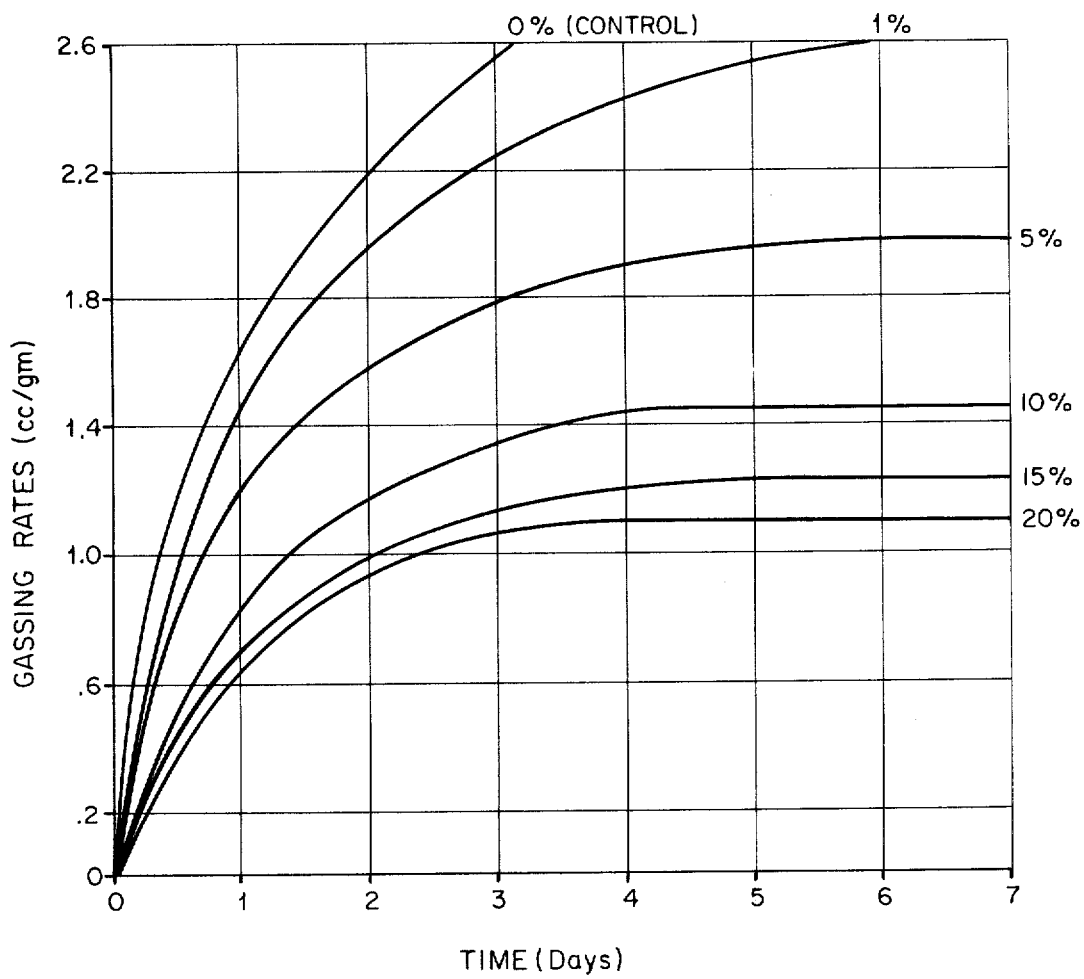
FIG. 2 is a graphic representation of the gassing rate of nickel oxyhydroxide depolarizer to which the metal hydroxide has been added subsequent to the ozonation of the nickel hydrate plotted against the time in days.

When the KOH was added to nickel oxyhydroxide after ozonation, some reduction in gassing of the nickel oxyhydroxide was obtained. For example, the total gas in a week was 1.97, 1.45 and 1.10 cc/gm for 10, 15 and 20% KOH additives, respectively. FIGS. 1 and 2 show these effects.

Table 2

Gassing Rates of NiOOH Treated with Various Amounts of KOH before and after Ozonation

| KOH % | Time of KOH Addition | Total Gas Evolved at 145°F (cc/gm/wk) | % Moisture |
|---|---|---|---|
| 1 | Before Ozonation | 2.36 | 1.8 |
| 5 | Before Ozonation | 1.10 | 4.8 |
| 10 | Before Ozonation | .45 | 7.2 |
| 15 | Before Ozonation | .20 | 9.4 |
| 20 | Before Ozonation | .15 | 11.0 |
| 25 | Before Ozonation | .23 | 11.2 |
| 30 | Before Ozonation | .17 | 12.0 |
| 1 | After Ozonation | 2.61 | 1.7 |
| 5 | After Ozonation | 1.97 | 4.2 |
| 10 | After Ozonation | 1.45 | 6.2 |
| 15 | After Ozonation | 1.10 | 8.0 |
| 20 | After Ozonation | 1.45 | 9.2 |
| 25 | After Ozonation | 1.35 | 10.4 |
| 30 | After Ozonation | 1.23 | 11.4 |
| 0 | Control | 3.06 | 1.4 |

Surprisingly, however, concentrations of 10 to 30% KOH added before ozonation according to the method of the present invention were unexpectedly effective in reducing gassing of the nickel oxyhydroxide. For example, the total gas evolved in a week was 0.45, 0.20 and 0.15 cc/gm for 10, 15 and 20% KOH additives, respectively. See FIGS. 1 and 2 for graphic representations of these effects.

EXAMPLE 2

Cells size 725 were constructed and tested. Each cell has an outside diameter of 0.736 – 0.738 inches, a height of 0.210 – 0.230 inches and a volume of 0.095 cubic inches. The cell has a two part container comprising an upper section or cap which houses the negative electrode or anode and a lower section or cup which houses positive electrode or cathode. The bottom cup is made of nickel plated steel and the cap is made of tin plated steel. The cap is insulated from the cup by means of an insulating and sealing collar of polyethylene and is integrally molded around the edges of the cap for insulating the cap from the cup and also to constitute airtight enclosure. The negative electrode of the cell comprises a gelled or semi-gelled zinc. The zinc electrode is separated from the positive electrode by means of an electrolyte absorbent layer and a separator. The electrolyte absorbent layer is made of electrolyte resistant, highly absorbent matted cotton fibres. The separator layer is Viskon. The depolarizer was inserted into the cell in pellet form, one pellet per cell. The dry cathode mix consisted of:

5 parts nickel oxyhydroxide (NiOOH)
1 part graphite and to that dry mix the following were added:

1% "Teflon" (Whitcon-8 inches) to serve as a binder and a lubricant
7.5% (weight %) of a 50% KOH - 50% $H_2O$ solution The above components were mixed well in a Patterson-Kelley blender and after the six became homogeneous, pellets were made of the cathode mix on suitable pelletizing apparatus. Each pellet weighed 1.69 + or −0.01 gram. See Table 3 below for test results.

Table 3

| | Depolarizer | Treatment Process | Anode Material | OCV (volts) | Amperage (Amps) | Impedance (ohms) | Cell Ht Expansion (mils) After 1 Wk at 145°F |
|---|---|---|---|---|---|---|---|
| 1 | Trivalent NiOOH | Ni(OH)₂ Ozonated | PDR Zn | 1.72 | 1.8 | 0.90 | 10 |
| 2 | Tetravalent NiOOH | 10% KOH added to Ni(OH)₂ then ozonated as in Ex. 1 | PDR Zn | 1.73 | 2.7 | 0.62 | 0–3 |
| 3 | " | Same as 2 | Gel Zn | 1.76 | 3.4 | 0.50 | 1–3 |
| 4 | " | Same as 2 except 10% LiOH.H₂O is used | PDR Zn | 1.78 | 1.2 | 1.4 | 1.5–3 |
| 5 | " | Same as 2 except 10% NaOH is used | PDR Zn | 1.76 | 3.1 | 0.51 | 0–3 |
| 6 | Trivalent NiOOH | Same as 2 except 10% Co(OH)₂ is used | PDR | 1.74 | 1.9 | 0.7 | 10 |
| 7 | Trivalent NiOOH | Same as 2 except 10% Mg(OH)₂ is used | PDR | 1.74 | 2.0 | 0.7 | 10 |

PDR Zn—Powder zinc with 14% mercury to prevent zinc corrosion.

As can be seen from the data above, primary cells utilizing tetravalent NiOOH depolarizer prepared according to the method of the invention (2, 3, 4 and 5) display unexpectedly reduced cell expansion. Potassium and sodium hydroxides are preferred metal hydroxides because of the high flash amperage and reduced impedance resulting in cells. Using hydroxides as in 6 and 7 resulted in trivalent NiOOH that showed severe expansion of cells at elevated temperature (145°F/1 wk.).

EXAMPLE 3

Cells size 825 were constructed in the same manner as the 725 size cells of Example 2 except the following dimensions were different:

Outside Cell Diameter: .900 – .905 inches (22.86–22.99 mm)
Cell Height: .218 – .228 inches (5.54–5.79 mm)
Volume: .116 cubic inches (1.90 cubic cm)
Weight: 3 ounces (8.50 grams)

Each polarizer pellet weighed 1.79 + or − .01 gram. See Table 4 below for test results.

Table 4: 825 Size Cells

In all instances Ni(OH)$_2$ was ozonated to NiOOH in preparation of the cell depolarizer, but cells tested varied in that the following various additional depolarizer preparation steps were taken:

|  | Control No Addition | 15% NaOH Added | 15% KOH Added | 15% Be(OH)$_2$ Added | 15% Ca(OH)$_2$ Added |
|---|---|---|---|---|---|
| Initial cell capacity to 0.90V cut-off voltage | 192 | 216 | 229 | 165 | 182 |
| Percent capacity retention at 4 wks at 113–50% | 80.0 | 87.5 | 91.0 | — | — |
| Percent capacity retention at 12 wks at 113–50% | 55.0 | 67.5 | 75.5 | — | — |
| Percent capacity retention at 2 yrs at RT (70°F) | 81.5 | 92.0 | 93.0 | 67.0 | 70.0 |
| Cell ht. increase at 4 wks at 113–50% (inches) | .0080 | .0005 | .0030 | — | — |
| Cell ht. increase at 12 wks at 113–50% (inches) | .0150 | .0005 | .0035 | .018 | .0170 |
| Cell ht. increase at 2 yrs. at RT (70°F) (inches) | .0100 | .0005 | .0020 | .0120 | .0130 |

(1) 113–50% - at 113°F and 50% relative humidity
(2) Cells discharged at 300 ohms 16 H/D As can be seen from the data above, primary cells utilizing a NiOOH depolarizer prepared according to the method of this invention, i.e., 15% NaOH or 15% KOH added before ozonation, display unexpectedly low degrees of cell bulging and good capacity retention as a result of the unexpected NiOOH stability in the cell.

The embodiments of the invention in which an exclusive property or privilege is claimed are defined as follows:

1. A method for preparing stable tetravalent nickel oxyhydroxide, which method comprises mixing an alkali metal hydroxide selected from the group consisting of sodium hydroxide, potassium hydroxide, cesium hydroxide, lithium hydroxide and rubidium hydroxide with nickel hydrate and dry ozonating the resultant mixture, wherein the amount of alkali metal in the mixture is from about 5 to about 40 weight percent based on the weight of the nickel hydrate.

2. A method according to claim 1 wherein the alkali metal hydroxide is potassium hydroxide.

3. A method according to claim 2 wherein the amount of potassium hydroxide present in the mixture is from about 5 to about 40 weight percent.

4. A method according to claim 1 wherein the alkali metal hydroxide is sodium hydroxide.

5. A method according to claim 4 wherein the amount of sodium hydroxide present in the mixture is from about 5 to about 30 weight percent.

6. A method according to claim 1 wherein the alkali metal hydroxide is lithium hydroxide.

7. A method according to claim 6 wherein the amount of lithium hydroxide present in the mixture is from about 5 to about 20 weight percent.

8. A method according to claim 1 wherein the dry ozonation is carried out at room temperature.

9. A method according to claim 1 wherein the ozonation is carried out at about 15°C.

* * * * *